Feb. 1, 1927.
R. S. SUTTON
DOME DAMPER
Filed Aug. 25, 1926
1,616,094
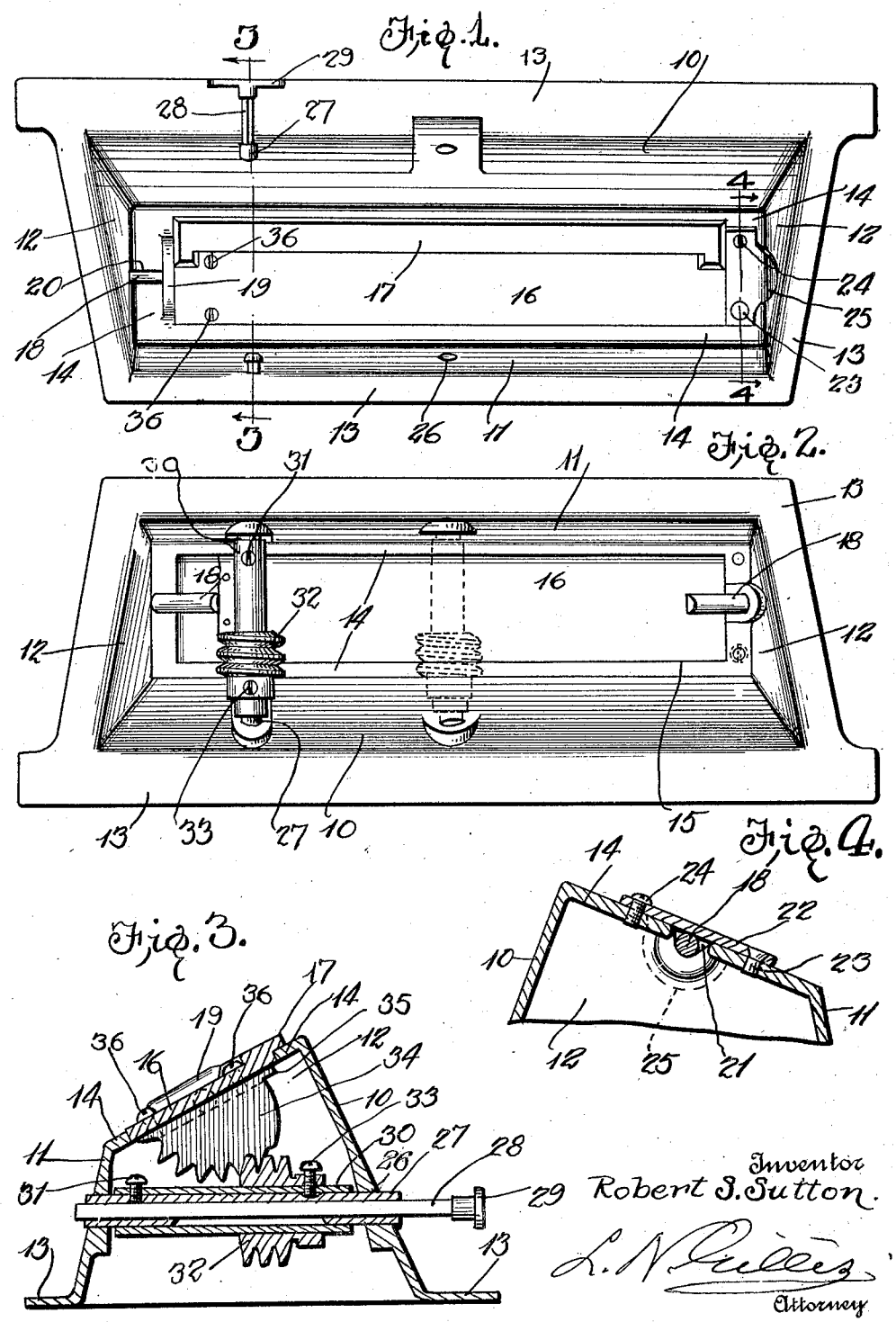
Inventor
Robert S. Sutton.
Attorney Patented Feb. 1, 1927.

1,616,094

UNITED STATES PATENT OFFICE.

ROBERT SUTTON SUTTON, OF INDIANA, PENNSYLVANIA.

DOME DAMPER.

Application filed August 25, 1926. Serial No. 131,480.

This invention relates to dampers for flues leading from fireplaces or, as they are commonly called, dome dampers.

In the construction of dampers of this description it is quite common to provide a frame or casing having an opening therein which may be closed by a plate or damper proper provided at its ends with pintles engaging in suitable bearings.

One important object of the invention is to provide an improved damper of this type wherein the damper plate will carry, directly attached thereto, a worm segment and a worm will be located within the casing and operable from the exterior, the worm meshing with the segment so that rotation of the worm effects tilting of the plate.

A second important object of the invention is to provide an improved arrangement of worm and worm segment selectively positionable at different points within the casing so that the one casing may be used for different styles of fireplaces.

A third important object of the invention is the provision of a novel bearing arrangement in such a device by means of which the plate may be removed for repairs or replacement without displacing the brick work.

A fourth important object of the invention is to provide an improved construction of dome damper wherein no special arrangement of brick work is necessary.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is an outside face view of a dome damper constructed in accordance with this invention.

Figure 2 is a view looking toward the inside thereof.

Figure 3 is a detail section on the line 3—3 of Figure 1, the section being somewhat enlarged.

Figure 4 is a detail section on the line 4—4 of Figure 1 and to an enlarged scale.

In the construction of the invention as herein disclosed there is provided a casing having longitudinally extending sides 10 and 11, the sides being inclined toward each other and the side 11 being of less width than the side 10. These sides are connected by trapezoidal ends 12 and from the ends and sides extend base flanges 13 which lie in the same plane throughout. Also the upper edges of the sides and ends are provided with inwardly extending flanges 14 which lie in a plane inclined to the base flanges and provide an opening 15 of rectangular shape. In this opening is fitted a damper plate 16 having at one edge a lip 17 which limits the movement of the damper plate in one direction. Each end of the damper plate is provided with a pintle 18 and at one end this pintle passes beneath a rib 19 formed on the end flange 14 and seats in a notch 20 formed in the end 12. At the opposite end the pintle seats in a notch 21 formed in that end 12 and is there held by a cover plate 22 which extends across the notch and carries at one end a pin 23 entering a suitable opening in the flange 14 at that end, the other end of the cover plate being secured to said flange by a screw 24. This cover plate has a lip 25 which engages against the end 12, the cover plate being thus prevented from rotating by the pin arrangement and being guided to proper position for the insertion of the screw 24 by said lip.

Centrally of the sides 10 and 11 and adjacent at least one end thereof are bearing openings 26 in which is seated a malleable iron hollow shaft 27, the opening through the shaft being preferably square to receive a square operating rod 28 having a head 29. Within the casing on this shaft is mounted a sleeve 30, the sleeve being held to the hollow shaft and the rod 28 being secured in position by a set screw 31. On the sleeve is carried a worm 32 which is secured in position by a set screw 33. Within the casing is a worm segment 34 which meshes with the worm 32 and is provided with an angularly disposed base 35 secured in desired position on the plate 16 by means of screws 36. Thus the worm and segment may be positioned as shown in full lines in Figure 2 or as shown in dotted lines in that Figure.

It is obvious that the rod 38 may extend outwardly through the brick work of the fireplace and that rotation of this rod will revolve the worm and thereby open or close the damper at the will of the operator. It will be noted that the worm and worm wheel afford not only close adjustment of the damper plate but also do not act to let the damper plate accidentally move from its adjusted position.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a dome damper, a casing having a draft opening therein, a damper plate controlling the opening having journals at its ends supported in said casing and revoluble on said journals to open and close the opening, a worm segment having a flange forming a base, means to secure the base detachably to a face of said plate to position the segment within the casing, a shaft extending transversely through the casing, and a worm on said shaft engaging said segment.

2. In a dome damper, a casing having a draft opening therein, a damper plate controlling the opening having journals at its ends supported in said casing and revoluble on said journals to open and close the opening, a worm segment having a flange forming a base, means to secure the base detachably to a face of said plate to position the segment within the casing, a hollow shaft extending transversely through the casing and having its ends journalled in the side walls of the casing, said shaft having its opening polygonal in cross section, an operating shaft slidable in said hollow shaft and having a cross section fitting the opening in the shaft, means to secure the operating shaft in adjusted position within the hollow shaft, and a worm carried by the hollow shaft and meshing with the segment.

3. In a dome damper, a casing having a draft opening therein, a damper plate controlling the opening having journals at its ends supported in said casing and revoluble on said journals to open and close the opening, a worm segment having a flange forming a base, means to secure the base detachably to a face of said plate to position the segment within the casing, a hollow shaft extending transversely through the casing and having its ends journalled in the side walls of the casing, said shaft having its opening polygonal in cross section, an operating shaft slidable in said hollow shaft and having a cross section fitting the opening in the shaft, means to secure the operating shaft in adjusted position within the hollow shaft, a sleeve fitted on said hollow shaft and of a length to fit between the side walls of the casing, a worm fixed to the sleeve, and means to secure the sleeve removably on the hollow shaft.

In testimony whereof I affix my signature.

ROBERT SUTTON SUTTON.